US008195257B2

(12) United States Patent
Pallone et al.

(10) Patent No.: US 8,195,257 B2
(45) Date of Patent: Jun. 5, 2012

(54) CASE ASSEMBLY FOR ANTENNA AMPLIFYING SYSTEM, ANTENNA AMPLIFYING SYSTEM AND MAST ANTENNA INTEGRATING SUCH A SYSTEM

(75) Inventors: Anthony Pallone, Civray De Touraine (FR); Thierry Gartner, Ciran (FR); Gregory Girard, Saint-Roch (FR); Eric Proteau, Mosnes (FR); John Howard, Bedfordshire (GB); Andrew Bennett, Bedfordshire (GB); Keith Smith, Bedforshire (GB); James E. Thompson, Mooresville, NC (US)

(73) Assignee: Jaybeam Wireless SAS, Amboise (FR)

( * ) Notice: Subject to any disclaimer, the term of this patent is extended or adjusted under 35 U.S.C. 154(b) by 281 days.

(21) Appl. No.: 12/526,121

(22) PCT Filed: Feb. 6, 2008

(86) PCT No.: PCT/EP2008/051469

§ 371 (c)(1), (2), (4) Date: Aug. 6, 2009

(87) PCT Pub. No.: WO2008/095965

PCT Pub. Date: Aug. 14, 2008

(65) Prior Publication Data

US 2010/0087236 A1 Apr. 8, 2010

(30) Foreign Application Priority Data

Feb. 9, 2007 (FR) ..................................... 07 53178

(51) Int. Cl.
*H04M 1/00* (2006.01)

(52) U.S. Cl. ................ 455/575.7; 455/575.1; 455/562.1

(58) Field of Classification Search ........................ None
See application file for complete search history.

(56) References Cited

U.S. PATENT DOCUMENTS

| | | | | |
|---|---|---|---|---|
| 5,963,854 | A | 10/1999 | Andreasson et al. | |
| 6,031,498 | A * | 2/2000 | Issler | 343/703 |
| 7,457,640 | B2 * | 11/2008 | Eddy | 455/562.1 |
| 7,664,468 | B2 * | 2/2010 | Wong et al. | 455/78 |
| 2003/0148747 | A1 * | 8/2003 | Yamamoto | 455/234.1 |
| 2004/0203284 | A1 | 10/2004 | Stolle et al. | |
| 2005/0136876 | A1 | 6/2005 | Broholm | |

FOREIGN PATENT DOCUMENTS

| | | | |
|---|---|---|---|
| DE | 2006734 | A1 | 8/1971 |
| DE | 2541870 | A1 | 3/1977 |
| EP | 0724337 | A2 | 7/1996 |
| FR | 2888672 | A1 | 1/2007 |
| WO | WO-2006059230 | A1 | 6/2006 |

OTHER PUBLICATIONS

International Search Report, Apr. 28, 2008.

* cited by examiner

*Primary Examiner* — Erika Gary
(74) *Attorney, Agent, or Firm* — Blank Rome LLP

(57) ABSTRACT

The invention relates to a case assembly for antenna amplifying system, an antenna amplifying system and a mast antenna incorporating such a system. According to the invention, the case assembly for antenna amplifying system having a general shape elongated along a longitudinal axis (34) comprises a control module (16) and two amplifying modules (9*a*, 9*b*) aligned therewith along the longitudinal axis (34), the control module (16) and both amplifying modules (9*a*, 9*b*) each comprising two longitudinal lateral walls (11*a*, 11*b*, 11*c*, 12*a*, 12*b*, 12*c*), an upper surface (36*a*, 36*b*, 36*c*) and a lower surface (37*a*, 37*b*, 37*c*) and having a small thickness.

15 Claims, 9 Drawing Sheets

CASE ASSEMBLY FOR ANTENNA AMPLIFYING SYSTEM, ANTENNA AMPLIFYING SYSTEM AND MAST ANTENNA INTEGRATING SUCH A SYSTEM

CROSS-REFERENCE TO RELATED APPLICATIONS

The present application is a National Phase of PCT/EP2008/051469, filed Feb. 6, 2008, which claims foreign priority to FR 07 53178 filed Feb. 9, 2007, the entire disclosure of which is incorporated herein by reference.

The present invention relates to a case assembly for antenna amplifying system, an antenna amplifying system and a mast antenna incorporating such a system.

In radiofrequency communication systems, of the mobile telephony type, the propagation of the signal representative of a user's voice or of data goes from the antenna of the mobile telephone towards a base station. This signal is then conveyed over a wireline network, for instance, towards another base station, which transmits the signal to the called party.

Each base station, still called relay antenna, covers a portion of territory designated "cell". A coverage zone is hence formed from a set of cells forming a meshed network of base stations.

Each base station includes an antenna which may transmit signals from the base station to the mobile phone of the user in a respective cell. In such a case, we are talking about a downlink. The antenna may also receive signals transmitted by the mobile phone of the user in this same cell. We are talking about an uplink.

The antennas of the base station transmit signals in a frequency range differing from that of the signals received so that these signals are transmitted and received by the same antenna.

Generally, the signals received by the antenna of the base station are weaker than the signals transmitted by the latter. It is then necessary to amplify the signals received with amplifiers of the tower-mounted amplifier (TMA) type, also called mast head amplifier (MHA) or tower top low noise amplifier (TTLNA).

Such amplifiers are known from documents US 2005/0136876, EP 0 724 337 and U.S. Pat. No. 5,963,854.

Document US 2005/0136876 divulges a TMA amplifier including filters capable of filtering radiofrequency signals transmitted or received by the antenna. The filters are formed of several resonant cavities including resonator elements. The TMA amplifier also comprises a low noise amplifier (LNA) intended for amplifying the signals received by the antenna. The filters are generally stacked on top of another, forming an amplifier having a significant depth.

The amplifier is generally placed close to the antenna so as to reduce the length of the coaxial supply cable connecting the amplifier to the antenna. Greater the length of the coaxial cable is, greater the signal loss in the coaxial cables is, leading to a degradation of the noise factor and a weaker sensitivity for the base station. The quality of the signal received by the base station is then lower.

FIG. 1 illustrates an antenna 1 of the prior art which is generally intended for being attached to a mast or a pylon. The antenna 1 is connected to an amplifier 3 via two coaxial cables 41. The antenna 1 is a double polarisation antenna, generally ±45°. Each coaxial cable 41 feeds a polarisation access. The amplifier 3 is arranged below the antenna 1.

Such a configuration is not ideal and raises signal losses problems by the coaxial cables. Moreover, the cables are wound for ensuring good mechanical handling which increases the length of the coaxial cables.

Other antennas 42, 43 of the prior art, as those illustrated on FIG. 8, include a conventional amplifier 3 of TMA type, fixed at the rear of the antenna. For certain antennas 42, the amplifier 3 is fixed on the protective envelope of the antenna 32. Other antennas 43 include an amplifier 3 inside the protective envelope of the antenna 32.

Nevertheless, these configurations do not improve the gain of the antenna significantly and raise space requirements problems of the antennas whereof the dimensions are important. The visual impact of these antennas on the environment is harmful. Moreover, they require rather long installation times since the operator must adjust separately the amplifier and the antenna.

One of the objectives of the present invention is hence to offer a case assembly for antenna amplifying system of reduced size and suitable to enable it to be embedded in an antenna without changing hardly the dimensions of the antenna.

Another objective of the present invention is to provide an antenna amplifying system comprising such a case and enabling to reduce the time and the installation cost of the antenna system. It is possible to adjust the parameters of the antenna (phase shifts) and those of the amplifier, simultaneously.

Finally, a last objective of the present invention is to offer a mast antenna incorporating such an amplifying system and enabling to improve the gain and the sensitivity of the antenna and to reduce its space requirements and its visual impact on the environment.

To this end, the invention relates to a case assembly for antenna amplifying system.

According to the invention, the case assembly for amplifying system of antenna having a general shape elongated along a longitudinal axis comprises a control module and two amplifying modules aligned therewith along the longitudinal axis, the control module and both amplifying modules each comprising two longitudinal lateral walls, an upper surface and a lower surface and having a small thickness, each of the amplifying modules comprising:

- a recess intended for receiving an amplification circuit;
- in its upper surface, compartments intended for receiving the filters of the amplifying system; and
- an access point for connection to the antenna;

the control module comprising:

- two supply access points, each associated respectively to an amplifying module; and
- a recess intended for receiving a supply line for high and/or low frequency signals transmitted to the antenna;
- a central compartment intended for receiving a control device of the amplifying system.

In different possible embodiments, the present invention also relates to the features which will appear during the following description and which should be considered individually or in all their technically possible combinations:

- the two amplifying modules are arranged on both sides of the control module and aligned therewith along the longitudinal axis, the control module and both amplifying modules forming an unitary assembly of small thickness, comprising two longitudinal lateral walls, an upper surface and a lower surface, the control module having a centre and the assembly being symmetrical with respect to an axis perpendicular to the upper surface and running through the centre of the control module: each of the amplifying modules comprising:

in one of its longitudinal lateral walls, a recess intended for receiving a portion of a supply line for high and/or low frequency signals transmitted to the antenna;

in the other one of its longitudinal lateral walls, the recess intended for receiving an amplification circuit;

in its upper surface, the compartments intended for receiving the filters of the amplifying system; and the access point for connection to the antenna which is situated close to the control module;

the control module comprising:

on each of its longitudinal lateral walls, one of the supply access points associated respectively to an amplifying module; and in each of its longitudinal lateral walls, the recess intended for receiving the other portion of the supply line for high and/or low frequency signals transmitted to the antenna;

the compartment intended for receiving a control device of the amplifying system;

the case assembly for antenna amplifying system includes a space between each amplifying module and the control module to accommodate the access points for connection to the antenna;

the amplifying modules and the control module are separate modules comprising transversal lateral walls, each of the amplifying modules comprising:

in its lower surface, the recess intended for receiving an amplification circuit;

in its upper surface, the compartments intended for receiving the filters of the amplifying system; and on the lower surface of the amplifying modules, the access point for connection to the antenna;

the control module comprising:

on each of its transversal lateral walls, a supply access points-associated respectively to an amplifying module;

inside the control module and close to its longitudinal lateral walls, the recess intended for receiving the supply line for high and/or low frequency signals transmitted to the antenna;

the compartment intended for receiving a control device of the amplifying system;

each amplifying module includes three compartments intended for receiving the filters of the amplifying system whereof:

a compartment intended for receiving a transmission frequency passband filter comprising a high frequency signal access point, the compartment intended for receiving a transmission frequency passband filter connecting the access point for connection to the antenna to the high frequency signal access point;

a compartment intended for receiving a first reception frequency passband filter comprising a amplifier input, the compartment intended for receiving a first reception frequency passband filter connecting the access point for connection to the antenna to the amplifier input; and a compartment intended for receiving a second reception frequency passband filter comprising an amplifier output, the compartment intended for receiving a second reception frequency passband filter connecting the amplifier output to the high frequency signal access point.

The invention also relates to an antenna amplifying system comprising two amplifying circuits, two supply lines for high and low frequency signals transmitted to the antenna and a control device of the amplifying system.

According to the invention, the antenna amplifying system comprises a case assembly for antenna amplifying system as defined previously.

In different possible embodiments, the present invention also relates to the features which will appear during the following description and which should be considered individually or in all their technically possible combinations:

each recess intended for receiving an amplifying circuit of the case assembly for antenna amplifying system includes one of both amplifying circuits, each amplifying circuit connecting the amplifier input of the compartment intended for receiving a first reception frequency passband filter to the amplifier output of the compartment intended for receiving a second reception frequency passband filter;

the control device of the amplifying system is arranged in the central compartment of the control module of the case assembly for antenna amplifying system, the control device of the amplifying system being connected to each amplifying circuit via supply means of the amplifier so as to enable the control of both amplifying circuits;

the control module of the case assembly for antenna amplifying system includes, on one of its longitudinal lateral walls, an access point for supplying remote control means of phase variation means connected to the device for controlling the amplifying system, so as to enable the latter to operate a remote control means of phase variation means;

for each supply line for high and/or low frequency signals transmitted to the antenna, a portion thereof is housed in the recess intended for receiving a portion of supply line for high and/or low frequency signals transmitted to the antenna of one of the amplifying modules, and the other portion is housed in one of the recesses intended for receiving the other portion of the supply line for high and/or low frequency signals transmitted to the antenna of the control module, each supply line for high and/or low frequency signals transmitted to the antenna connecting the high frequency signal access point of the compartment intended for receiving a transmission frequency passband filter of a amplifying module to one of the supply access points of the control module, associated to this amplifying module;

each supply line for high and/or low frequency signals transmitted to the antenna comprises a filter intended for separating the low frequency signals from the high frequency signals.

The invention also relates to a mast antenna comprising:

a back plane elongated in shape having a longitudinal axis, a lower end, a front face and a rear face, at least two radiating elements situated along the front face of the back plane and at least one beam forming circuit arranged on the back plane and including phase variation means for changing the electrical tilt of the antenna and two supply access points of the antenna; and two supply means of the antenna of length L, each supply means of the antenna connecting one supply access point of the antenna to the access point for connection to the antenna of one of the amplifying modules.

According to the invention, the mast antenna comprises an antenna amplifying system as defined previously, the antenna amplifying system being arranged on the rear face of the back plane of the antenna, parallel to the longitudinal axis of the latter so as to minimise the length L of both supply means of the antenna.

In different possible embodiments, the present invention also relates to the features which will appear during the following description and which should be considered individually or in all their technically possible combinations:

the mast antenna comprises a distance control means of the phase variation means arranged on the rear face of the back plane of the antenna, said remote control means of the phase variation means being connected to the supply access point of the remote control means of phase variation means of the control module so as to enable to operate the remote control means of the phase variation means by the control device of the amplifying system;

the mast antenna includes a protective envelope, the antenna amplifying system, the remote control means of the phase variation means and the back plane of the antenna being embedded in the antenna, inside the protective envelope;

the width of the antenna amplifying system is substantially equal to that of the back plane of the antenna.

By "embedded" in the antenna is meant in the sense of the present invention, an amplifying system arranged inside the envelope of the antenna, without it being necessary to increase the minimal depth of this envelope relative to an antenna, besides identical, not incorporating the amplifying system.

The case assembly for antenna amplifying system exhibits an elongated shape and a small depth, which makes it more compact and suitable for embedding in the envelope of the antenna.

Moreover, the invention enables to arrange the access points for connection to the antenna of the amplifying system quite close to the supply access points of the antenna, thereby reducing the length of the connection cables and consequently enables to improve the noise factor and the gain of the antenna.

The amplifying system of the invention may be pre-adjusted fully in factory, before installing the antenna on the mast or pylon. It hence does not require any tricky adjustments when installing the antenna.

The invention will be described more in detail with reference to the appended drawings wherein:

FIGS. 2 and 3 represent respectively a lateral view and a front view of an antenna amplifying system, according to a first embodiment of the invention.

Figure 1:
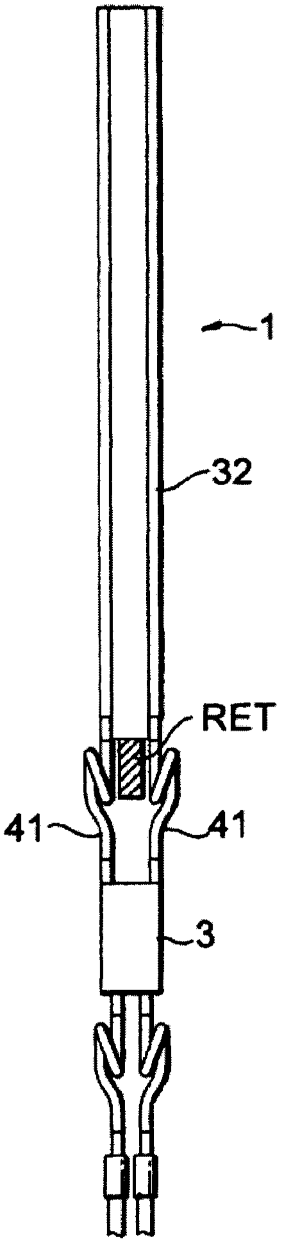
FIGURE 1 PRIOR ART
FIG. 1 represents an antenna associated with an amplifier according to the prior art.

Such an antenna amplifying system comprises a case assembly for amplifying system of antenna having a general shape elongated along a longitudinal axis 34.

The case assembly for antenna amplifying system includes a control module 16 having a centre 35 and two amplifying modules 9*a*, 9*b* arranged on both sides of the control module 16. In a preferred manner, the control module 16 is positioned in the centre of the case assembly for antenna amplifying system. Alternatively, it could be not positioned symmetrically. The control modules 16, which is a central control module, and both amplifying modules 9*a*, 9*b*, which are lateral amplifying modules, are aligned along the longitudinal axis 34.

The control module 16 and both amplifying modules 9*a*, 9*b* include each two longitudinal lateral walls 11*a*, 11 b, 11*c*, 1 2*a*, 1 2*b*, 12*c*, an upper surface 36*a*, 36*b*, 36*c* and a lower surface 37*a*, 37*b*, 37*c*.

They form a unitary assembly of small thickness, comprising two longitudinal lateral walls 11, 12, an upper surface 36 and a lower surface 37.

By small thickness is meant a thickness lower than 48 mm so that the case for amplifying system exhibits a relatively flat shape. In a preferred embodiment, the thickness of the unitary assembly is ranging between 20 mm and 48 mm.

In a more preferred embodiment, the antenna amplifying system exhibits a thickness of approximately 31 mm, a width of approximately 150 mm and a length of approximately 560 mm. The previous thickness values are given for an antenna amplifying system comprising a lid without any screw head. With the screw heads on the lid, the thickness of the antenna amplifying system is approximately 33.4 mm.

The unitary assembly is in the form of a parallelepiped but may also take on other shapes. Both amplifying modules 9*a*, 9*b* may have rounded ends, for instance.

The unitary assembly is symmetrical relative to an axis 38 perpendicular to the upper surface 36 and running through the centre of the control module 35.

The case assembly for antenna amplifying system may be in aluminium or in plastic material.

Each of the amplifying modules 9*a*, 9*b* includes an access point for connection to the antenna 5 situated close to the control module 16.

The access points for connection to the antenna 5 may be arranged in a space 18 situated between each amplifying module 9*a*, 9*b* and the control module 16. This space is preferably 11 mm. It may be ranging between 3 mm and 15 mm. Its width must be sufficient for letting through the coaxial cables connecting the amplifying system to the antenna.

Each space 18 situated between an amplifying module 9*a*, 9*b* and the control module 16 extends from one of the longitudinal lateral walls 11, 12 up to approximately half the case for amplifying system, in the transversal direction. The spaces 18 are symmetrical relative to the axis 38 perpendicular to the upper surface 36 and running through the centre 35 of the control module 16.

The arrangement of the access points for connection to the antenna 5 in their respective space 18 enables to reduce the length of the supply means of the antenna 31 which may consist of coaxial cables.

Both amplifying modules 9*a*, 9*b* are totally independent.

Figure 4:
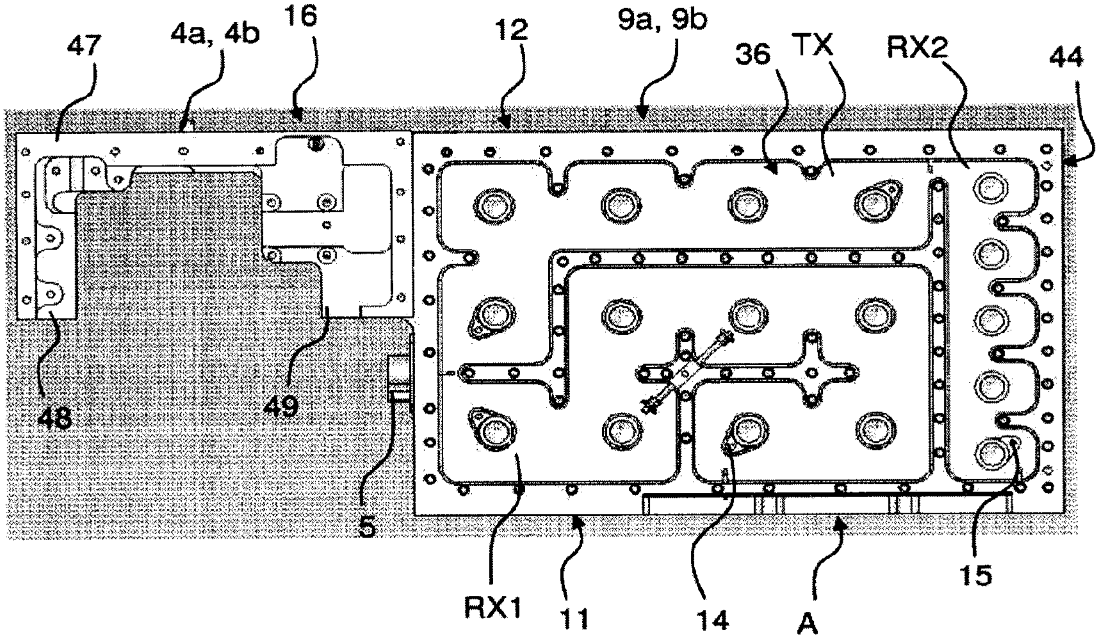
FIG. 4 represents a front view of half a case assembly for antenna amplifying system according to this first embodiment of the invention.

FIG. 4 represents a front view of half a case assembly for antenna amplifying system.

Each of these halves comprises an amplifying module 9*a*, 9*b* and half a control module 16. Both halves of the case assembly for antenna amplifying system are identical.

This manufacturing method enables to simplify the manufacture of the case assembly for antenna amplifying system and to reduce the set up times of the machines which are set up only once for both case halves and for all those which will be manufactured at a later stage.

Both these case halves are assembled and held interconnected to one another by bolts, for instance.

One of the longitudinal side walls of half a case for amplifying system is formed of a longitudinal lateral wall 11*a*, 11*b*, 12*a*, 12*b* of an amplifying module 9*a*, 9*b* and of a longitudinal lateral wall 11*c*, 12*c* of the control module 16.

The other longitudinal side wall of half the case for amplifying system is formed of the other longitudinal lateral wall 11*a*, 11*b*, 12*a*, 12*b* of the amplifying module 9*a*, 9*b*.

Half the control module 16 is formed of a U-shaped part 47 protruding on the longitudinal lateral wall 11*c*, 12*c* of the control module 16, towards the inside of the control module 16. The U-shaped part 47 comprises two opposite portions 48, 49 whereof a wide portion 49, interconnected with the amplifying module 9*a*, 9*b* and a small width 48, adjacent to the space 18 situated between the other amplifying module 9*a*, 9*b* and the control module 16.

Each of the amplifying modules 9*a*, 9*b* comprises, in its upper surface 36*a*, 36*b*, compartments Tx, Rx1, Rx2 intended for receiving the filters of the amplifying system.

Figure 2:
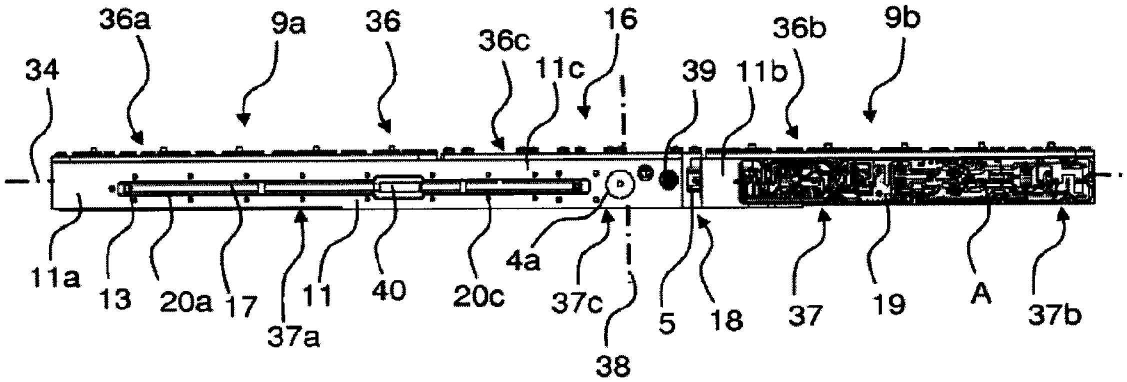
FIG. 2 represents a lateral view of an antenna amplifying system according to a first embodiment of the invention.
Figure 3:
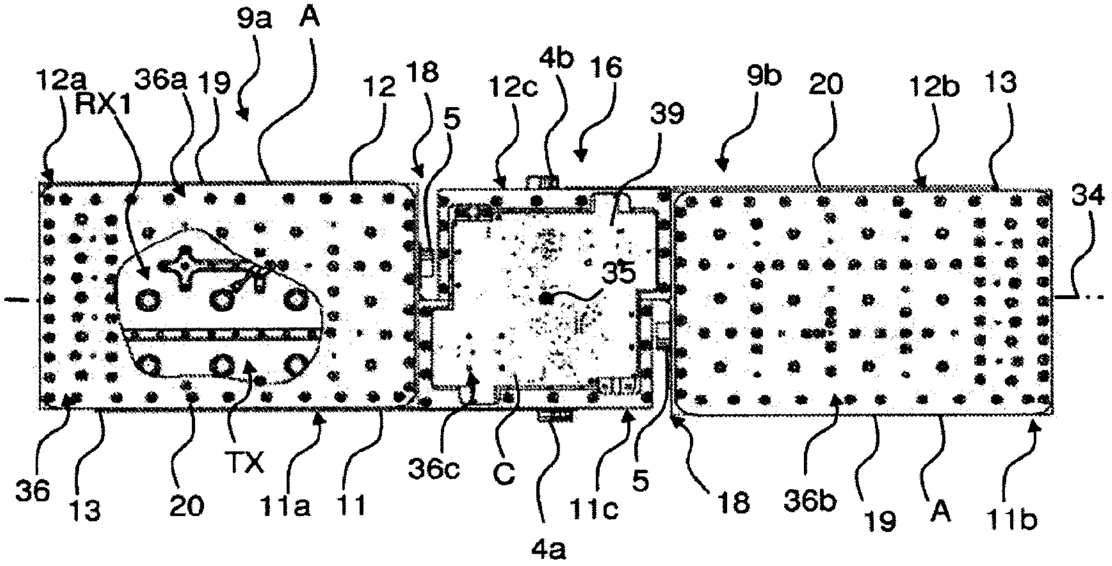
FIG. 3 represents a front view of this antenna amplifying system according to the first embodiment of the invention.

In the example of FIGS. 2, 3, the compartments intended for receiving the filters of the amplifying system Tx, Rx1, Rx2 are three in number.

Figure 5:
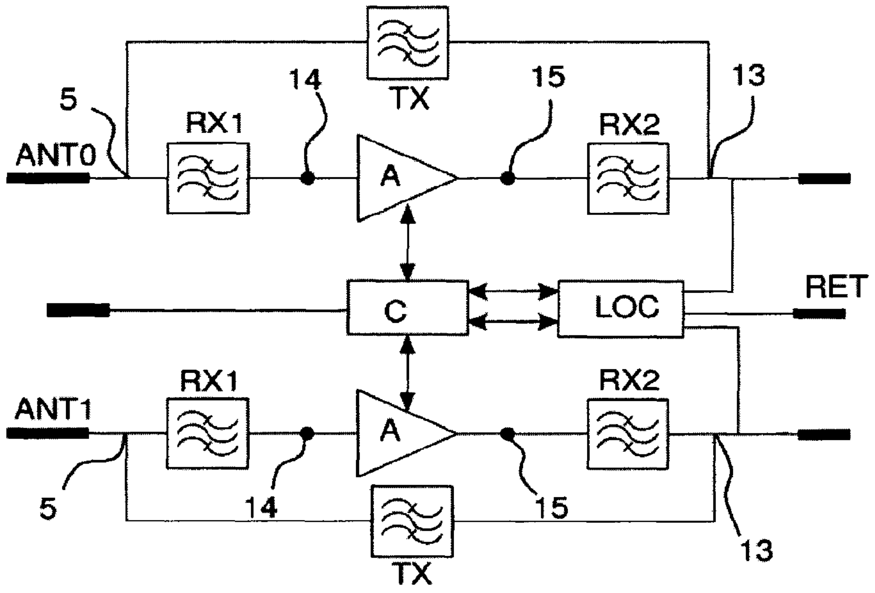
FIG. 5 represents the diagram of the antenna amplifying system.

They include a compartment intended for receiving a transmission frequency passband filter Tx comprising a high frequency signal access point 13. The compartment intended for receiving a transmission frequency passband filter Tx comprises the access point for connecting the antenna 5 to the high frequency signal access point 13, as illustrated on the diagram of FIG. 5.

The compartments intended for receiving the filters of the amplifying system Tx, Rx1, Rx2 also include a compartment intended for receiving a first reception frequency passband filter Rx1 comprising an amplifier input 14. The compartment intended for receiving a first reception frequency passband filter Rx1 links the access point connecting the antenna 5 to the amplifier input 14.

The compartments intended for receiving the filters of the amplifying system Tx, Rx1, Rx2 also include a compartment intended for receiving a second reception frequency passband filter Rx2 comprising an amplifier output 15. The compartment intended for receiving a second reception frequency passband filter Rx2 links the amplifier output 15 to the high frequency signal access point 13.

The filters of the amplifying system Tx, Rx1, Rx2 consist of several resonators, parallel to one another.

The transmission frequency passband filter Tx comprises five resonators aligned along a direction perpendicular to the longitudinal axis 34. The five resonators are arranged close to the end of transversal wall 44 of the lateral module 9*b* and parallel to the latter.

The first reception frequency passband filter Rx1 comprises seven resonators arranged between the transmission frequency passband filter Tx and the access point for connection to the antenna 5.

The second reception frequency passband filter Rx2 comprises five resonators arranged close to the high frequency signal access point 13.

Each of the amplifying modules 9*a*, 9*b* comprises, in one of its longitudinal lateral walls 11*a*, 11*b*, 12*a*, 12*b*, a recess 19 intended for receiving an amplifying circuit A.

Each amplifying circuit A connects the amplifier input 14 of the compartment intended for receiving a first reception frequency passband filter Rx1 to the amplifier output 15 of the compartment intended for receiving a second reception frequency passband filter Rx2.

The amplifying circuits A are preferably of the low noise amplifier (LNA) type.

They enable to amplify the high frequency signals received by the antenna.

Each of the amplifying modules 9*a*, 9*b* comprises, in the other one of its longitudinal lateral walls 11*a*, 11*b*, 12*a*, 12*b*, a recess 20*a* intended for receiving a portion of supply line for high and/or low frequency signals transmitted to the antenna 17.

The control module 16 comprises, on each of its longitudinal lateral walls 11*c*, 12*c*, a supply access point 4*a*, 4*b*. A supply access point is associated respectively to a single amplifying module 9*a*, 9*b*.

The control module 16 comprises, in each of its longitudinal lateral walls 11*c*, 12*c*, a recess 20*c* intended for receiving the other portion of the supply line for high and/or low frequency signals transmitted to the antenna 17.

A portion of each supply line for high and/or low frequency signals transmitted to the antenna 17 is housed in the recess 20*a* intended for receiving a portion of supply line for high and/or low frequency signals transmitted to the antenna of one of the amplifying modules 9*a*, 9*b*.

The other portion is housed in one of the recesses 20*c* intended for receiving the other portion of the supply line for high and/or low frequency signals transmitted to the antenna, of the control module 16.

Each supply line for high and/or low frequency signals transmitted to the antenna 17 connects the high frequency signal access point 13 of the compartment intended for receiving a transmission frequency passband filter Tx of a amplifying module 9*a*, 9*b*, to one of the supply access points 4*a*, 4*b* of the control module 16 associated to this amplifying module 9*a*, 9*b*.

The supply lines for high and low frequency signals transmitted to the antenna 17 act as a transmission line for the high frequency signals transmitted to the antenna and act as a filter for separating the low frequencies from the high frequencies.

The high frequency signals correspond to the signals transmitted by the antenna. The high frequency signals are transmitted by the antenna (downlink) in a frequency range ranging between 2110 MHz and 2170 MHz. The high frequency signals are received by the antenna (uplink) in a frequency range ranging between 1920 MHz and 1980 MHz.

The above frequency ranges are the ones used by UMTS cellular networks. Other embodiments can also be realised with network like GSM, PCN, PCS, . . . with their corresponding downlink and uplink frequency ranges.

The low frequency signals are used to feed the control card, the amplifiers and the remote control means of the phase variation means (RET).

Each supply line for high and/or low frequency signals transmitted to the antenna 17 comprises a filter 40 intended for separating the low frequency signals from the high frequency signals which are transmitted towards the transmission frequency passband filter Tx.

The filter 40 exhibits a diameter greater than that of the remainder of the supply line. The recesses 20*a* intended for receiving a portion of supply line for high and/or low frequency signals transmitted to the antenna 9, from the amplifying modules 9*a*, 9*b* include a wide portion of recess, at the filter 40.

What follows describes the operation of the antenna amplifying system.

Figure 6:
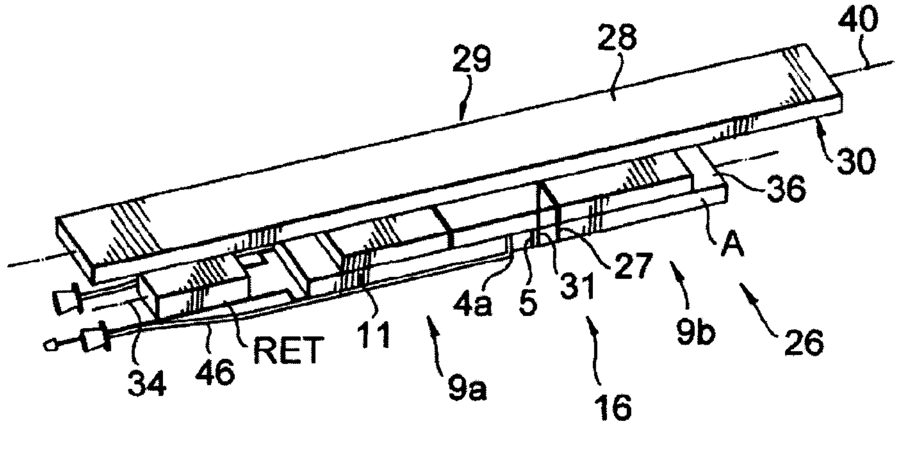
FIG. 6 represents diagrammatically a mast antenna incorporating an amplifying system.

As illustrated on FIG. 6, each supply access point 4*a*, 4*b* of the control module 16 is connected to a coaxial cable 46 which is itself connected to the base station. Each supply access point 4*a*, 4*b* is attributed a polarisation access)(±45°).

Each coaxial cable 46 transmits to a supply access point 4*a*, 4*b*, the high and low frequency signals coming from the base station. The latter arrive at the respective supply lines for high and low frequency signals transmitted to the antenna 17. The high frequency signals are separated from the low frequency signals via the filter 40.

The high frequency signals come up at the high frequency signal access point 13 of the transmission frequency passband filter Tx for filtering by the latter.

The high frequency filtered signals exit the transmission frequency passband filter Tx through the access point for connection to the antenna 5 which is connected to an antenna via a means for supplying the antenna 31, of the coaxial cable type for instance, itself connected to a supply access point of the antenna 27.

The control module 16 comprises a central compartment 39 intended for receiving a control device of the amplifying system C which may be a control card, for instance.

The control device of the amplifying system C is connected to each amplifying circuit A via supply means of the amplifier 22 so as to enable the control of both amplifying circuits A by a same control device of the amplifying system C.

The low frequency signals which have been filtered by the filter 40, are transmitted to the control device of the amplifying system C.

In uplink, the high frequency signals received by the antenna are transmitted to the amplifying modules 9*a*, 9*b* via supply access points of the antenna 27, connected to the supply means of the antenna 31.

The high frequency signals received are then transmitted to the first reception frequency passband filters Rx1 by the respective access points for connection to the antenna 5.

The high frequency signals received are filtered a first time then exit the amplifier inputs 14 for being amplified by the amplifying circuits A.

The high frequency signals filtered and amplified are then transmitted to the second reception frequency passband filters Rx2 by the amplifier outputs 15 for being filtered a second time.

They exit through the high frequency signal access points 13 of the transmission frequency passband filters Tx, and are directed towards the supply line for high and/or low frequency signals transmitted to the antenna 17, then transmitted towards the base station.

The invention also relates to a mast antenna, represented on FIGS. 6 and

FIG. 6 represents diagrammatically a mast antenna incorporating an amplifying system according to an embodiment of the invention.

Figure 7:
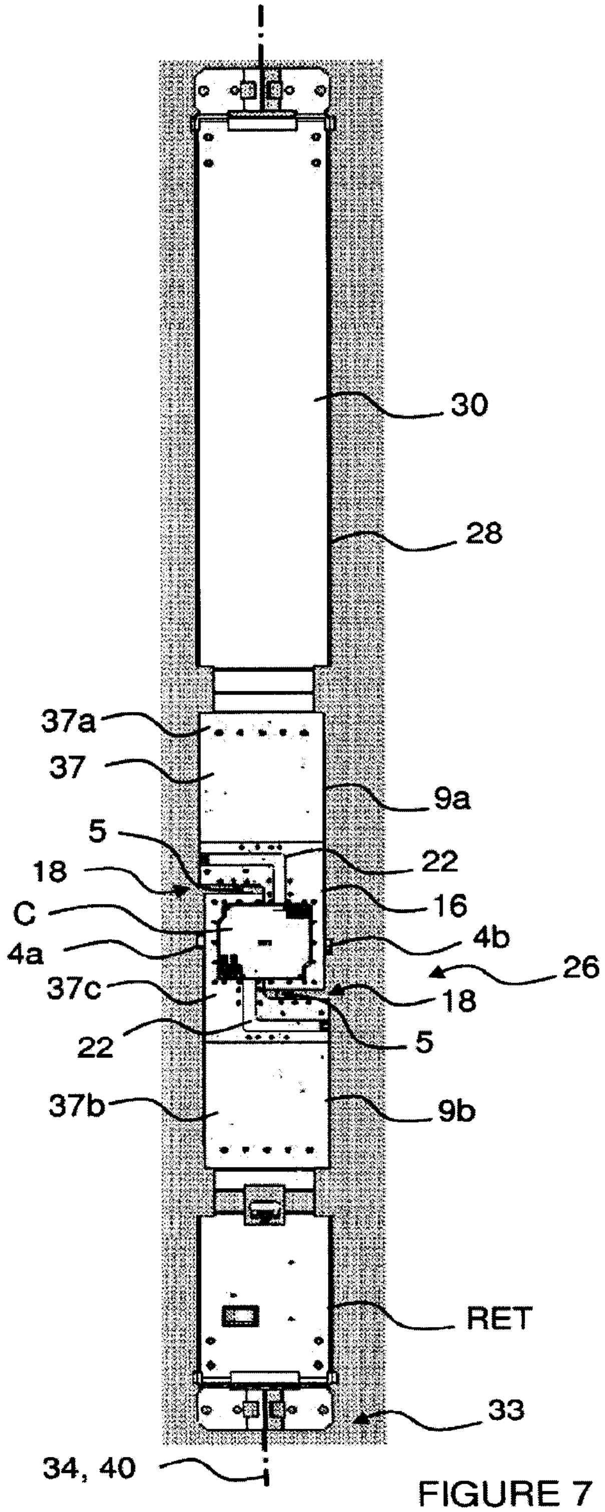
FIG. 7 represents the back view of the mast antenna according to the first embodiment of the invention.

FIG. 7 represents a back view of the mast antenna.

Such a mast antenna is known by the document FR 2866756.

Advantageously, the mast antenna 45 is of double crossed polarisation type and it hence includes two polarisation accesses.

The mast antenna 45 comprises a back plane 28 elongated in shape having a longitudinal axis 40, a front face 29 and a rear face 30, as well as at least two radiating elements situated along the front face 29 of the back plane. Generally, when the mast antenna 45 is in place, this longitudinal axis 40 is vertical.

The mast antenna 45 also comprises at least one beam forming circuit arranged on the back plane 28.

The beam forming circuit comprises phase variation means for modifying the tilt angle of the main beam axis. These phase variation means include at least one phase-shifting element.

Throughout the printed circuit, a longitudinal half, left for instance, corresponds to the beam forming circuit for one of the polarisation accesses, and the other longitudinal half, symmetrical to the first one, corresponds to the same functions for the other polarisation.

The mast antenna 45 also comprises two supply means of the antenna 31 of length L.

Each supply means of the antenna 31 connects one of both supply access points of the antenna 27 to the access point for connection to the antenna 5 of one of the amplifying modules 9*a*, 9*b*.

According to an embodiment of the invention, the mast antenna 45 comprises an antenna amplifying system 26 as defined previously.

The antenna amplifying system 26 is arranged on the rear face 30 of the back plane 28 of the antenna, parallel to the longitudinal axis 40 of the latter and close to both supply access points of the antenna 27 so as to minimise the length L of both supply means of the antenna 31.

The length L of each supply means of the antenna 31 ranges between 20 mm and 100 mm. It is preferably 70 mm, as in the example of FIG. 6, the length L depends on the position of the case assembly for antenna amplifying system arranged on the antenna. The position of the case assembly for antenna amplifying system is adjusted on the antenna so as to the access points for connection to the antenna 5 are as close as possible to the supply access points of the antenna 27, minimising the length L of both supply means 31.

Advantageously, both supply means 31 may be air lines.

It may be different for each supply means of the antenna 31. The means for supplying the antenna 31 are preferably coaxial cables.

In this embodiment, the longitudinal axis 40 of the back plane 28 of the antenna is parallel to the longitudinal axis 34 of the case assembly for antenna amplifying system. It may also be non parallel.

Preferably, the antenna amplifying system 26 is arranged on the rear face 30 of the back plane 28 of the antenna, on the side of its upper surface 36. The upper surface 36 of the amplifying system is adjacent to the rear face 30 of the back plane 28.

It is also possible to have the lower surface 37 of the antenna amplifying system 26 on the rear face 30 of the back plane 28 of the antenna.

In the example of FIG. 7, the antenna amplifying system 26 is not quite arranged in the middle of the antenna 45.

In a possible embodiment, the antenna amplifying system 26 is arranged in the middle of the antenna 45.

The mast antenna 45 comprises a remote control means of the phase variation means (RET), arranged on the rear face 30 of the back plane 28 of the antenna, between its lower end 33 and the antenna amplifying system 26.

The case assembly for antenna amplifying system comprises fastening means for attachment to the antenna 45. These fastening means may be situated at each end of the case assembly for antenna amplifying system. One of the ends of the case assembly for antenna amplifying system may be attached to the remote control means of the phase variation means (RET). The other end may be attached to another element protruding on the back plane 28 of the antenna.

The width of the antenna amplifying system 26 is substantially equal to that of the back plane 28 of the antenna. It may also be slightly greater or slightly smaller.

As explained previously, the arrangement of the access points for connection to the antenna 5 in their respective space 18 enables to reduce the length L of the supply means of the antenna 31 and to improve the gain of the antenna.

The control module 16 of the case assembly for antenna amplifying system includes, on one of its longitudinal lateral walls 11*c*, 12*c*, an access point for supplying remote control means of phase variation means. The access point for supplying remote control means of phase variation means is not represented on the Figures.

The access point for supplying remote control means of phase variation means is connected to the device for controlling the amplifying system C, so as to enable the latter to operate a remote control means of phase variation means (RET) of the mast antenna 45.

The device for controlling the amplifying system C is set up for controlling simultaneously both amplifying circuits A and the remote control means of phase variation means (RET), which enables to use a single control device of the amplifying system C. When installing the antenna on a site, the adjustment of the parameters of the antenna (phase-shifters) and those of the amplifiers, are performed simultaneously, which avoids double intervention of the operator. The gains in time and money are significant.

The control module 16 of the case assembly for antenna amplifying system may include, on one of its longitudinal lateral walls 11*c*, 12*c*, another access point for supplying remote control means of phase variation means 39.

Both access points for supplying remote control means of phase variation means 39 are preferably situated on longitudinal lateral walls 11*c*, 12*c* different.

The other access point for supplying remote control means of phase variation means 39 is connected to the AISG bus (Antenna Interface Standard Group) of the control device of the amplifying system C.

The mast antenna 45 is housed in a protective envelope 32. The antenna amplifying system 26, the remote control means of the phase variation means (RET) and the back plane 28 of the antenna, are embedded in the antenna, inside the protective envelope 32, as illustrated on FIG. 8.

A compact mast antenna 45 can thus be obtained, with low visual impact on the environment.

Figure 8:
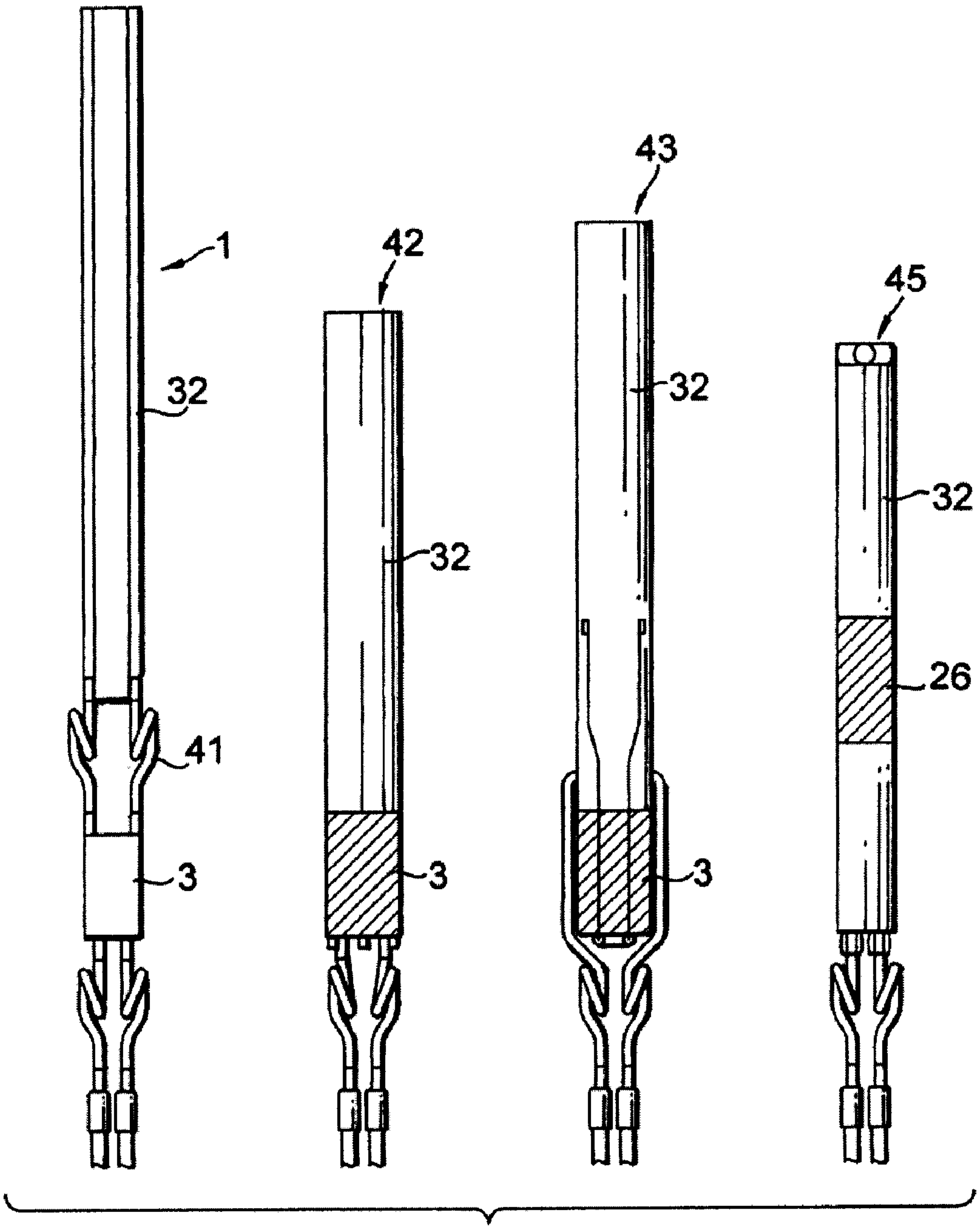
FIG. 8 is a representation of antennas of the prior art and of the mast antenna according to the first embodiment of the invention enabling to compare their dimension.

FIG. 8 illustrates three antennas 1, 42, 43 of the prior art among which, from left to right, a stand alone antenna (SAA) type 1, an antenna 42 having a conventional TMA amplifier 3 fixed to the protective envelope of the antenna 32 and an antenna 43 having a conventional TMA amplifier 3 arranged behind the antenna 43, inside the protective envelope 32, as well the mast antenna 45 according to the invention.

In this particular embodiment, the mast antenna 45, according to the invention, exhibits a height of approximately 155 cm, a width of approximately 16 cm and a thickness of approximately 8 cm.

The antennas of the prior art, of the SAA stand alone antenna type 1 reach a height of 230 cm.

The antennas 43 of the prior art having a conventional TMA amplifier 3 arranged behind the antenna, inside the protective envelope 32, may exhibit a height reaching 170 cm, as well as a width and a thickness reaching 20 cm.

The reduced dimensions of the mast antenna 45 according to the invention, also enable to obtain smaller wind resistance and lower risks of damage under stormy conditions.

Moreover, as explained previously, the significant reduction in length of the coaxial cables (or supply means of the antenna 31) connecting the antenna to the amplifier enables to reduce the internal losses in high frequency signals received by the antenna, in case of an uplink. This leads to improve the noise factor which is approximately 1.3 dB (for a gain at 12 dBi (decibel relative to the isotropic antenna)) and the gain of the antenna which is approximately 16.2 dBi.

In comparison, the noise factor (for a gain at 12 dBi) of the antennas of the prior art 1, 42, 43 is 1.5 dB and the gain of these antennas varies between 15.5 dBi and 15.8 dBi. The gain is 15.5 dBi for a stand alone antenna SAA 1, 15.7 dBi for an antenna 42 having a conventional TMA amplifier 3 fixed to the protective envelope of the antenna 32, and 15.8 dBi for an antenna 43 having a conventional TMA amplifier 15 arranged behind the antenna 43, inside the protective envelope 32.

The gain of the mast antenna 45 according to the invention is also greater, in the case for a downlink, i.e. for the high frequency signals transmitted by the antenna. It is approximately 16.9 dBi against approximately 15.8 dBi for the antennas of the prior art such as stand alone antennas SAA 1.

Figure 9:
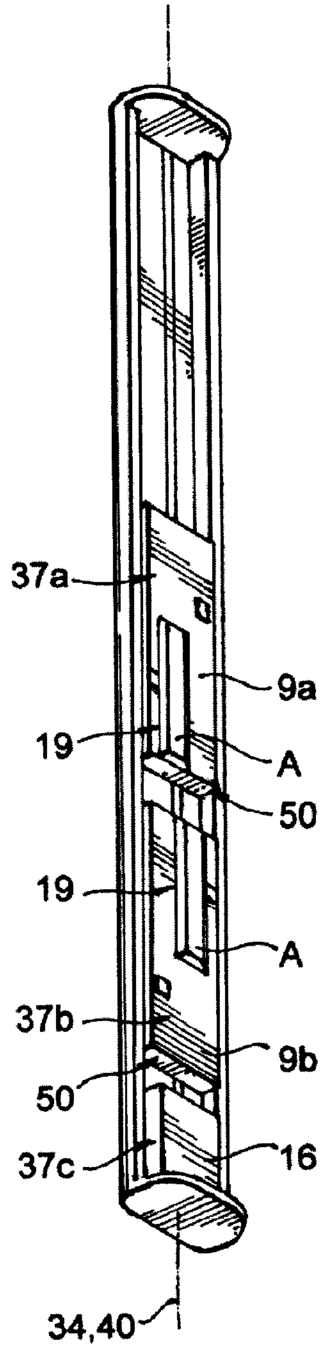
FIG. 9 represents a mast antenna according to a second embodiment of the invention.

FIG. 9 represents a mast antenna according to a second embodiment of the invention.

In this second embodiment, the amplifying modules 9*a*, 9*b* and the control module 16 are separate modules comprising transversal lateral walls 50, 51. In the example of FIG. 9, the control module 16 is below the amplifying modules 9*a*, 9*b*.

The control module 16 and the two amplifying modules 9*a*, 9*b* are aligned therewith along the longitudinal axis 34 and have each a small thickness which is lower than 48 mm. The thickness of each separated module can be identical or nearly identical.

Figure 10:
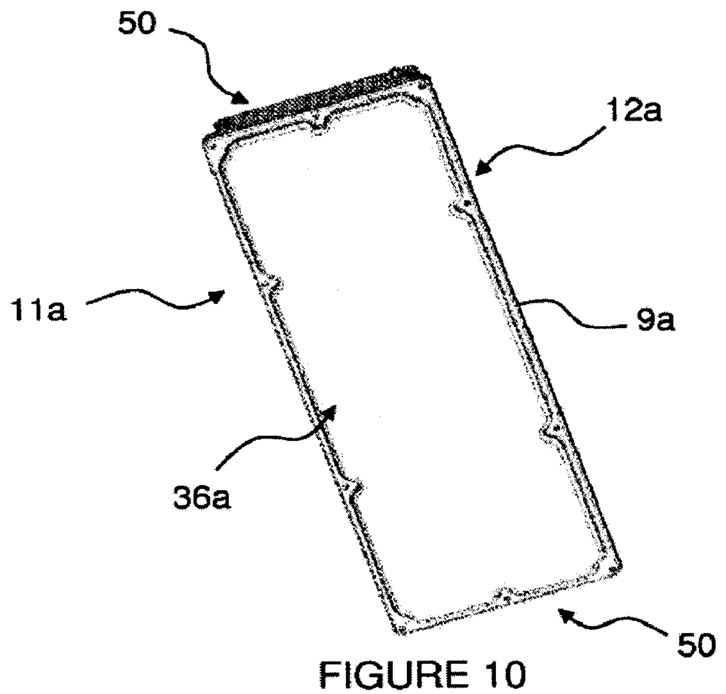
FIG. 10 represents the top view of an amplifying module according to the second embodiment of the invention.
Figure 11:
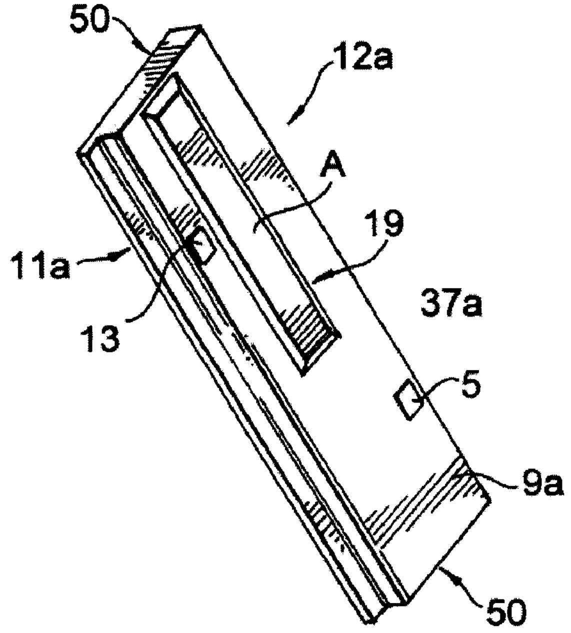
FIG. 11 represents the back view of this amplifying module according to the second embodiment of the invention.

FIG. 10 represents the top view of an amplifying module according to this second embodiment of the invention. FIG. 11 represents the back view of this amplifying module.

As illustrated in FIG. 11, each of the amplifying modules 9*a*, 9*b* comprises in its lower surface 37*a*, 37*b*, a recess 19 intended for receiving an amplification circuit. In this FIG. 11, the amplifying circuit A is covered by a cover. In a preferred manner, this cover is not protruding on the lower surface 37*a*, 37*b* of the amplifying modules 9*a*, 9*b*.

As illustrated in FIG. 10, each of the amplifying modules 9*a*, 9*b* comprises in its upper surface 36*a*, 36*b*, compartments Tx, Rx1, Rx2 intended for receiving the filters of the amplifying system. In this FIG. 10, the compartments Tx, Rx1, Rx2 are covered by a cover. The amplifying modules 9*a*, 9*b* are elongated in shape along the longitudinal axis 34.

The access point for connection to the antenna 5 is situated on the lower surface 37*a*, 37*b* of the amplifying modules 9*a*, 9*b*.

The high frequency signal access point 13 is positioned on the lower surface 37*a*, 37*b* of amplifying module 9*a*, 9*b*.

In another possible embodiment, the high frequency signal access point 13 is positioned on one of the transversal lateral wall 50.

Figure 12:
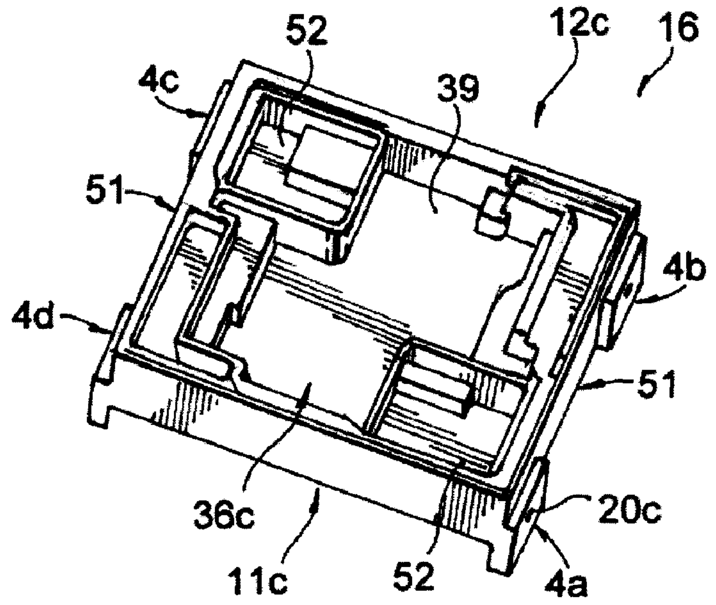
FIG. 12 represents the top view of a control module according to the second embodiment of the invention.
Figure 13:
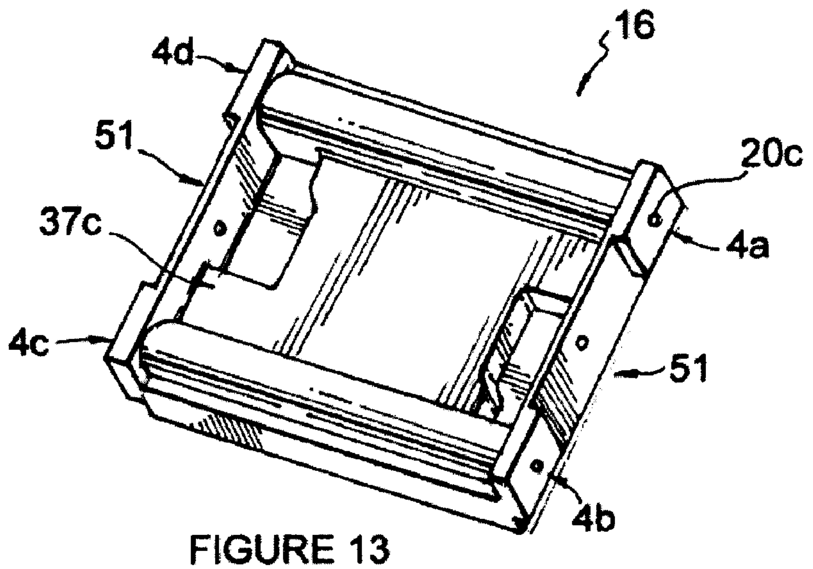
FIG. 13 represents the back view of this control module according to said other embodiment.

FIG. 12 represents the top view of a control module according to the second embodiment of the invention. FIG. 13 represents the bottom view of this control module.

The control module 16 comprises four access ports 4*a*, 4*b*, 4*c*, 4*d*. It comprises on one of its transversal lateral walls 51, two supply access points 4*a*, 4*b* associated respectively to an amplifying module 9*a*, 9*b*. On the other of its transversal lateral walls 51, the control module 16 comprises two output ports 4*c*, 4*d*.

Inside the control module 16 and close to its longitudinal lateral walls 11*c*, 12*c*, the control module 16 comprises a recess 20*c* intended for receiving the supply line for high and/or low frequency signals transmitted to the antenna. This recess 20*c* is parallel to the longitudinal lateral walls 11*c*, 12*c*. In this second embodiment, and in opposition to the first embodiment, this recess 20*c* is open only at its opposing ends. Each recess 20*c* goes through a tubular element. Each tubular element is positioned inside the control module 16.

The control module 16 comprises a compartment 39 intended for receiving a control device of the amplifying system. The compartment 39 is in the middle of the control module 16.

The control module 16 comprises two compartments 52 for receiving lightning protection circuits, each disposed symmetrically in a corner of the control module 16.

In a particular embodiment of the invention, the supply line 17 can feed one of the supply access points 4*a*, 4*b* with only the high frequency signals.

Each supply line for high and/or low frequency signals transmitted to the antenna 17 can comprise a filter 40 intended for separating the low frequency signals from the high frequency signals and positioned inside the recess 20*c* intended for receiving the supply line for high and/or low frequency signals.

The invention claimed is:

1. A case assembly for amplifying system of antenna having a general shape elongated along a longitudinal axis comprising a control module and two amplifying modules aligned therewith along the longitudinal axis, the control module and both amplifying modules each comprising two longitudinal lateral walls, an upper surface and a lower surface and having a small thickness, each of the amplifying modules comprising:

a recess intended for receiving an amplification circuit;

in its upper surface, compartments intended for receiving the filters of the amplifying system; and an access point for connection to the antenna;

the control module comprising:

two supply access points, each associated respectively to an amplifying module; and a recess intended for receiving a supply line for high and/or low frequency signals transmitted to the antenna;

a central compartment intended for receiving a control device of the amplifying system.

2. A case assembly for antenna amplifying system according to claim 1, characterised in that the two amplifying modules are arranged on both sides of the control module and aligned therewith along the longitudinal axis, the control module and both amplifying modules forming an unitary assembly of small thickness, comprising two longitudinal lateral walls, an upper surface and a lower surface, the control module having a centre and the assembly being symmetrical with respect to an axis perpendicular to the upper surface and running through the centre of the control module: each of the amplifying modules comprising:

in one of its longitudinal lateral walls, a recess intended for receiving a portion of a supply line for high and/or low frequency signals transmitted to the antenna;

in the other one of its longitudinal lateral walls, the recess intended for receiving an amplification circuit;

in its upper surface, the compartments intended for receiving the filters of the amplifying system; and the access point for connection to the antenna which is situated close to the control module;

the control module comprising:

on each of its longitudinal lateral walls, one of the supply access points associated respectively to an amplifying module; and in each of its longitudinal lateral walls, the recess intended for receiving the other portion of the supply line for high and/or low frequency signals transmitted to the antenna;

the compartment intended for receiving a control device of the amplifying system.

3. A case assembly for antenna amplifying system according to claim 2, characterised in that it includes a space between each amplifying module and the control module to accommodate the access points for connection to the antenna.

4. A case assembly for antenna amplifying system according to claim 1, characterised in that the amplifying modules and the control module are separate modules comprising transversal lateral walls, each of the amplifying modules comprising:

in its lower surface, the recess intended for receiving an amplification circuit;

in its upper surface, the compartments intended for receiving the filters of the amplifying system; and on the lower surface of the amplifying modules, the access point for connection to the antenna;

the control module comprising:

on each of its transversal lateral walls, a supply access point associated respectively to an amplifying module;

inside the control module and close to its longitudinal lateral walls, the recess intended for receiving the supply line for high and/or low frequency signals transmitted to the antenna;

the compartment intended for receiving a control device of the amplifying system.

5. A case assembly for antenna amplifying system according to claim 1, characterised in that each amplifying module includes three compartments intended for receiving the filters of the amplifying system whereof:

a compartment intended for receiving a transmission frequency passband filter comprising a high frequency signal access point, the compartment intended for receiving a transmission frequency passband filter connecting the access point for connection to the antenna to the high frequency signal access point, a compartment intended for receiving a first reception frequency passband filter comprising a amplifier input, the compartment intended for receiving a first reception frequency passband filter connecting the access point for connection to the antenna to the amplifier input, and a compartment intended for receiving a second reception frequency passband filter comprising an amplifier output, the compartment intended for receiving a second reception frequency passband filter connecting the amplifier output to the high frequency signal access point.

6. An antenna amplifying system comprising two amplification circuits, two supply lines for high and/or low frequency signals transmitted to the antenna and a control device of the amplifying system characterised in that it includes a case assembly for antenna amplifying system as defined in claim 1.

7. An antenna amplifying system according to claim 6, characterised in that each recess intended for receiving an amplifying circuit of the case assembly for antenna amplifying system includes one of both amplifying circuits, each amplifying circuit connecting the amplifier input of the compartment intended for receiving a first reception frequency passband filter to the amplifier output of the compartment intended for receiving a second reception frequency passband filter.

8. An antenna amplifying system according to claim 6, characterised in that the control device of the amplifying system is arranged in the central compartment of the control module of the case assembly for antenna amplifying system, the control device of the amplifying system being connected to each amplifying circuit via supply means of the amplifier so as to enable the control of both amplifying circuits.

9. An antenna amplifying system according to claim 6, characterised in that the amplifying module of the case assembly for antenna amplifying system includes, on one of its longitudinal lateral walls, an access point for supplying remote control means of phase variation means connected to the device for controlling the amplifying system, so as to enable the latter to operate a remote control means of phase variation means.

10. An antenna amplifying system according to claim 6, characterised in that, for each supply line for high and/or low frequency signals transmitted to the antenna, a portion thereof is housed in the recess intended for receiving a portion of supply line for high and/or low frequency signals transmitted to the antenna of one of the amplifying modules and the other part is housed in one of the recesses intended for receiving the other portion of the supply line for high and/or low frequency signals transmitted to the antenna of the control module, each supply line for high and/or low frequency signals transmitted to the antenna connecting the high frequency signal access point of the compartment intended for receiving a transmission frequency passband filter of a amplifying module to one of the supply access points of the control module, associated to this amplifying module.

11. An antenna amplifying system according to claim 10, characterised in that each supply line for high and/or low frequency signals transmitted to the antenna comprises a filter intended for separating the low frequency signals from the high frequency signals.

12. A mast antenna comprising:

a back plane elongated in shape having a longitudinal axis, a lower end, a front face and a rear face, at least two radiating elements situated along the front face of the back plane and at least one beam forming circuit arranged on the back plane and comprising phase variation means for changing the electrical tilt of the antenna and two supply access points of the antenna, and two supply means of the antenna of length L, each supply means of the antenna connecting one supply access point of the antenna to the access point for connection to the antenna of one of the amplifying modules, characterised in that it comprises:

an antenna amplifying system as defined in claim 6, the antenna amplifying system being arranged on the rear face of the back plane of the antenna, parallel to the longitudinal axis of the latter so as to minimise the length L of both supply means of the antenna.

13. A mast antenna according to claim l2, characterised in that it comprises a distance control means of the phase variation means arranged on the rear face of the back plane of the antenna, said remote control means of the phase variation means being connected to the supply access point of remote control means of the phase variation means of the control module so as to enable to operate said remote control means of the phase variation means by the control device of the amplifying system.

14. A mast antenna according to claim 12, characterised in that it comprises a protective envelope, the antenna amplifying system, the remote control means of the phase variation means and the back plane of the antenna being embedded in the antenna, inside the protective envelope.

15. A mast antenna according to claim 12, characterised in that the width of the antenna amplifying system is substantially equal to that of the back plane of the antenna.

* * * * *